United States Patent
Jiang et al.

(10) Patent No.: US 11,586,814 B2
(45) Date of Patent: Feb. 21, 2023

(54) PARAPHRASE SENTENCE GENERATION METHOD AND APPARATUS

(71) Applicant: Huawei Technologies Co., Ltd., Shenzhen (CN)

(72) Inventors: Xin Jiang, Hong Kong (CN); Lifeng Shang, Hong Kong (CN); Hang Li, Shenzhen (CN); Zichao Li, Hong Kong (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/856,450

(22) Filed: Apr. 23, 2020

(65) Prior Publication Data
US 2020/0250377 A1    Aug. 6, 2020

Related U.S. Application Data

(63) Continuation of application No. PCT/CN2018/103502, filed on Aug. 31, 2018.

(30) Foreign Application Priority Data

Oct. 26, 2017  (CN) .......................... 201711015214.6

(51) Int. Cl.
*G06F 40/289* (2020.01)
*G06F 40/237* (2020.01)

(52) U.S. Cl.
CPC .......... *G06F 40/237* (2020.01); *G06F 40/289* (2020.01)

(58) Field of Classification Search
CPC ........ G06F 16/345; G06F 40/30; G06F 40/56; G06F 40/237; G06F 16/3347;
(Continued)

(56) References Cited

U.S. PATENT DOCUMENTS 6,523,026 B1 *  2/2003  Gillis ................. G06F 16/3332
8,000,957 B2     8/2011  Deshpande et al.
(Continued)

FOREIGN PATENT DOCUMENTS

CN        1794240 A      6/2006
CN      105637540 A      6/2016
(Continued)

OTHER PUBLICATIONS

Socher et al. "CS 224D: Deep Learning for NLP", publisher: Stanford.edu, published: 2015, pp. 1-12). (Year: 2015).*
(Continued)

*Primary Examiner* — Wilson W Tsui
(74) *Attorney, Agent, or Firm* — Conley Rose, P.C.

(57) ABSTRACT

A paraphrase sentence generation method and apparatus relating to the research field of natural language processing include generating m second sentences based on a first sentence and a paraphrase generation model, determining a matching degree between each of the m second sentences and the first sentence based on a paraphrase matching model, and determining n second sentences from the m second sentences based on matching degrees among the m second sentences and the first sentence, where the paraphrase generation model is obtained through reinforcement learning-based training based on a reward of the paraphrase matching model.

21 Claims, 7 Drawing Sheets

(58) Field of Classification Search
CPC ............... G06F 40/253; G06F 16/2237; G06F 16/3329; G06F 40/151; G06F 40/289
See application file for complete search history.

(56) References Cited

U.S. PATENT DOCUMENTS

| | | | | |
|---|---|---|---|---|
| 10,713,439 | B2* | 7/2020 | Lee | G06F 40/56 |
| 2011/0295589 | A1* | 12/2011 | Brockett | G06F 40/289 |
| | | | | 704/4 |
| 2016/0004766 | A1* | 1/2016 | Danielyan | G06F 40/30 |
| | | | | 707/723 |
| 2017/0109434 | A1* | 4/2017 | Boxwell | G06N 5/04 |
| 2017/0278018 | A1 | 9/2017 | Mnih et al. | |
| 2017/0323636 | A1* | 11/2017 | Xiao | G06F 40/289 |
| 2018/0300400 | A1* | 10/2018 | Paulus | G06F 40/58 |
| 2018/0329883 | A1* | 11/2018 | Leidner | G06F 16/2237 |
| 2018/0365231 | A1 | 12/2018 | Li et al. | |
| 2019/0034416 | A1* | 1/2019 | Al Hasan | G06N 3/0454 |
| 2020/0027004 | A1 | 1/2020 | Qian et al. | |

FOREIGN PATENT DOCUMENTS

| | | |
|---|---|---|
| CN | 105787560 A | 7/2016 |
| CN | 105989027 A | 10/2016 |
| CN | 106326212 A | 1/2017 |
| CN | 106557563 A | 4/2017 |
| CN | 107092664 A | 8/2017 |
| CN | 107239446 A | 10/2017 |
| CN | 107273503 A | 10/2017 |
| CN | 107291783 A | 10/2017 |

OTHER PUBLICATIONS

Zhao, S., et al., "Application-driven Statistical Paraphrase Generation," ACL, Proceedings of the 47th Annual Meeting of the ACL and the 4th IJCNLP of the AFNLP, Aug. 2-7, 2009, pp. 834-842.

Cao, J., et al., "Joint Copying and Restricted Generation for Paraphrase," Proceedings of the THrity-First AAAI Conference on Artificial Intelligence, 2017, pp. 3152-3158.

Prakash, A., et al., "Neural Paraphrase Generation with Stacked Residual LSTM Networks," arXiv preprint arXiv:1610.03098 Oct. 13, 2016, 12 pages.

Ranzato, M., et al,. "Sequence Level Training with Recurrent Neural Networks," ICLR, airXiv:1511.06732v3 [cs.LG], Dec. 15, 2015, 15 pages.

Bennett, Laura J.; Australian Patent Application No. 15/266,754; Title: "System and Method for Automatic, Unsupervised Paraphrase Generation Using a Novel Framework that Learns Syntactic Construct While Retaining Semantic Meaning"; Filing Date: Sep. 15, 2016.

* cited by examiner

PARAPHRASE SENTENCE GENERATION METHOD AND APPARATUS

CROSS-REFERENCE TO RELATED APPLICATIONS

This application is a continuation of International Patent Application No. PCT/CN2018/103502 filed on Aug. 31, 2018, which claims priority to Chinese Patent Application No. 201711015214.6 filed on Oct. 26, 2017. The disclosures of the aforementioned applications are hereby incorporated by reference in their entireties.

TECHNICAL FIELD

This application relates to the research field of natural language processing, and in particular, to a paraphrase sentence generation method and apparatus.

BACKGROUND

A paraphrase is a different way of expressing a same meaning. Paraphrases are commonly seen in natural languages, reflecting flexibility and diversity of languages. A major category of research on paraphrases is paraphrase generation. Paraphrase generation plays an important role in many directions of natural language processing. At present, a paraphrase sentence of a sentence is directly generated by a paraphrase generator obtained through training based on parallel data for paraphrasing. However, accuracy of this paraphrase sentence generation method is not high.

SUMMARY

Embodiments of this application provide a paraphrase sentence generation method and apparatus, to improve accuracy of a generated paraphrase sentence.

To achieve the foregoing objective, the embodiments of this application provide the following technical solutions.

According to a first aspect, a paraphrase sentence generation method is provided. The method includes obtaining a first sentence, generating m second sentences based on the first sentence and a paraphrase generation model, where there is a paraphrase relationship between the second sentences and the first sentence, determining matching degrees between the m second sentences and the first sentence based on a paraphrase matching model, where a higher matching degree between one second sentence and the first sentence indicates a higher probability that the second sentence and the first sentence are paraphrases of each other, and determining n second sentences from the m second sentences based on the matching degrees between the m second sentences and the first sentence, where the n second sentences are paraphrase sentences of the first sentence, m is an integer greater than 0, and n is an integer greater than 0 but less than or equal to m, where the paraphrase generation model and the paraphrase matching model are both constructed by a deep neural network, and the paraphrase generation model is obtained through reinforcement learning-based training based on a reward fed back by the paraphrase matching model. According to the method provided in the first aspect, the paraphrase generation model is obtained through reinforcement learning-based training based on the reward fed back by the paraphrase matching model. A feature of reinforcement learning lies in enabling the model to improve. In this application, the paraphrase generation model can be continuously improved in a process of reinforcement learning performed on the paraphrase generation model, intensifying a trend for the paraphrase generation model to generate a more accurate paraphrase sentence. This enables the paraphrase generation model to more accurately generate the paraphrase sentence of the first sentence, that is, leads to a higher probability that the generated m second sentences are the paraphrase sentences of the first sentence. In addition, the paraphrase sentence generation apparatus may first generate the m second sentences based on the paraphrase generation model, and then determine the n second sentences from the m second sentences based on the paraphrase matching model. A paraphrase matching process leads to a higher probability that the n second sentences are the paraphrase sentences of the first sentence, thereby improving accuracy of the generated paraphrase sentences.

In a possible design, the reward is a matching degree, determined by the paraphrase matching model, between a first input sentence and a first output sentence, where the first input sentence is an input sentence of the paraphrase generation model, the first output sentence is a sentence generated by the paraphrase generation model based on the first input sentence, and there is a paraphrase relationship between the first input sentence and the first output sentence. In this possible implementation, the paraphrase generation model adjusts its model parameters based on the reward fed back by the paraphrase matching model. Based on this mechanism, the model parameters in the paraphrase generation model are continuously trained and adjusted such that the paraphrase generation model can generate a paraphrase sentence in a more accurate and controllable way.

In a possible design, the paraphrase generation model is a model obtained through reinforcement learning performed on the paraphrase generation model according to a policy gradient algorithm, where inputs of the policy gradient algorithm include the first input sentence, the first output sentence, and the reward.

In a possible design, the paraphrase generation model includes a primary generation model, where the primary generation model is a model obtained through training based on parallel data for paraphrasing, the parallel data for paraphrasing includes at least one paraphrase sentence pair, and the paraphrase sentence pair includes two sentences that are paraphrases of each other.

In a possible design, the paraphrase generation model further includes a secondary generation model, the paraphrase generation model is a model obtained by integrating the primary generation model and the secondary generation model, the secondary generation model is a model generated based on a paraphrase generation rule set, and the paraphrase generation rule set includes at least one paraphrase generation rule. In this possible implementation, the paraphrase generation model integrates the paraphrase generation rule in a probability model, and effectively utilizes the parallel data for paraphrasing and the paraphrase generation rule such that the paraphrase generation model generates more accurate second sentences.

In a possible design, the primary generation model and the secondary generation model are integrated using an attention mechanism, where the attention mechanism is used to dynamically adjust words in the first sentence and an attention degree of the paraphrase generation rule in the process of generating the m second sentences by the paraphrase generation model, and the attention degree is represented by an attention vector set. In this possible implementation, the paraphrase generation model is obtained by integrating the primary generation model and the secondary generation model using the attention mechanism such that the paraphrase generation model is still a machine learning model, and end-to-end training can be performed, thereby reducing system complexity. Moreover, the paraphrase generation model can be data-driven, and integrates knowledge of the paraphrase generation rule. This improves training efficiency and a use effect of paraphrase generation.

In a possible design, the attention vector set includes an attention vector that corresponds to the at least one paraphrase generation rule in a one-to-one manner, an attention vector corresponding to a first paraphrase generation rule is obtained through calculation based on a first paraphrase sentence pair, the first paraphrase sentence pair meets the first paraphrase generation rule, and the first paraphrase generation rule is any one of the at least one paraphrase generation rule.

In a possible design, the paraphrase matching model includes a primary matching model, where the primary matching model is a model obtained through training based on paraphrase matching data, the paraphrase matching data includes at least one matching sentence pair, and the matching sentence pair includes two sentences that are paraphrases of each other or not paraphrases of each other.

In a possible design, the paraphrase matching model further includes at least one secondary matching model, the paraphrase matching model is a model obtained by integrating the primary matching model and the at least one secondary matching model, and the secondary matching model is a model generated according to a paraphrase matching rule. In this possible implementation, a matching degree between two sentences can be measured from different dimensions when there are a variety of paraphrase matching rules.

According to a second aspect, a paraphrase sentence generation apparatus is provided. This apparatus has a function of implementing any method provided in the first aspect. This function may be implemented by hardware, or may be implemented by hardware executing corresponding software. The hardware or the software includes one or more units corresponding to the foregoing functions. This apparatus may exist in a product form of a chip.

According to a third aspect, a paraphrase sentence generation apparatus is provided. The apparatus includes a memory and a processor, where the memory is configured to store a computer executable instruction, and the processor is configured to execute the computer instruction stored in the memory to perform the following actions obtaining a first sentence, generating m second sentences based on the first sentence and a paraphrase generation model, where there is a paraphrase relationship between the second sentences and the first sentence, determining matching degrees between the m second sentences and the first sentence based on a paraphrase matching model, where a higher matching degree between one second sentence and the first sentence indicates a higher probability that the second sentence and the first sentence are paraphrases of each other, and determining n second sentences from the m second sentences based on the matching degrees between the m second sentences and the first sentence, where the n second sentences are paraphrase sentences of the first sentence, m is an integer greater than 0, and n is an integer greater than 0 but less than or equal to m, where the paraphrase generation model and the paraphrase matching model are both constructed by a deep neural network, and the paraphrase generation model is obtained through reinforcement learning-based training based on a reward fed back by the paraphrase matching model. This apparatus may exist in a product form of a chip.

In a possible design, the reward is a matching degree, determined by the paraphrase matching model, between a first input sentence and a first output sentence, where the first input sentence is an input sentence of the paraphrase generation model, the first output sentence is a sentence generated by the paraphrase generation model based on the first input sentence, and there is a paraphrase relationship between the first input sentence and the first output sentence.

In a possible design, the paraphrase generation model is a model obtained through reinforcement learning performed on the paraphrase generation model according to a policy gradient algorithm, where inputs of the policy gradient algorithm include the first input sentence, the first output sentence, and the reward.

In a possible design, the paraphrase generation model includes a primary generation model, where the primary generation model is a model obtained through training based on parallel data for paraphrasing, the parallel data for paraphrasing includes at least one paraphrase sentence pair, and the paraphrase sentence pair includes two sentences that are paraphrases of each other.

In a possible design, the paraphrase generation model further includes a secondary generation model, the paraphrase generation model is a model obtained by integrating the primary generation model and the secondary generation model, the secondary generation model is a model generated based on a paraphrase generation rule set, and the paraphrase generation rule set includes at least one paraphrase generation rule.

In a possible design, the primary generation model and the secondary generation model are integrated using an attention mechanism, where the attention mechanism is used to dynamically adjust words in the first sentence and an attention degree of the paraphrase generation rule in the process of generating the m second sentences by the paraphrase generation model, and the attention degree is represented by an attention vector set.

In a possible design, the attention vector set includes an attention vector that corresponds to the at least one paraphrase generation rule in a one-to-one manner, an attention vector corresponding to a first paraphrase generation rule is obtained through calculation based on a first paraphrase sentence pair, the first paraphrase sentence pair meets the first paraphrase generation rule, and the first paraphrase generation rule is any one of the at least one paraphrase generation rule.

In a possible design, the paraphrase matching model includes a primary matching model, where the primary matching model is a model obtained through training based on paraphrase matching data, the paraphrase matching data includes at least one matching sentence pair, and the matching sentence pair includes two sentences that are paraphrases of each other or that are not paraphrases of each other.

In a possible design, the paraphrase matching model further includes at least one secondary matching model, the paraphrase matching model is a model obtained by integrating the primary matching model and the at least one secondary matching model, and the secondary matching model is a model generated according to a paraphrase matching rule.

According to a fourth aspect, a computer-readable storage medium including an instruction is provided. When the instruction is run on a computer, the computer is enabled to perform any method provided in the first aspect.

According to a fifth aspect, a computer program product including an instruction is provided. When the computer program product is run on a computer, the computer is enabled to perform any method provided in the first aspect.

For the technical effects brought by any one of the design manners in the second aspect to the fifth aspect, refer to the technical effects brought by different design manners in the first aspect. Details are not described herein again.

DESCRIPTION OF EMBODIMENTS

Figure 1:
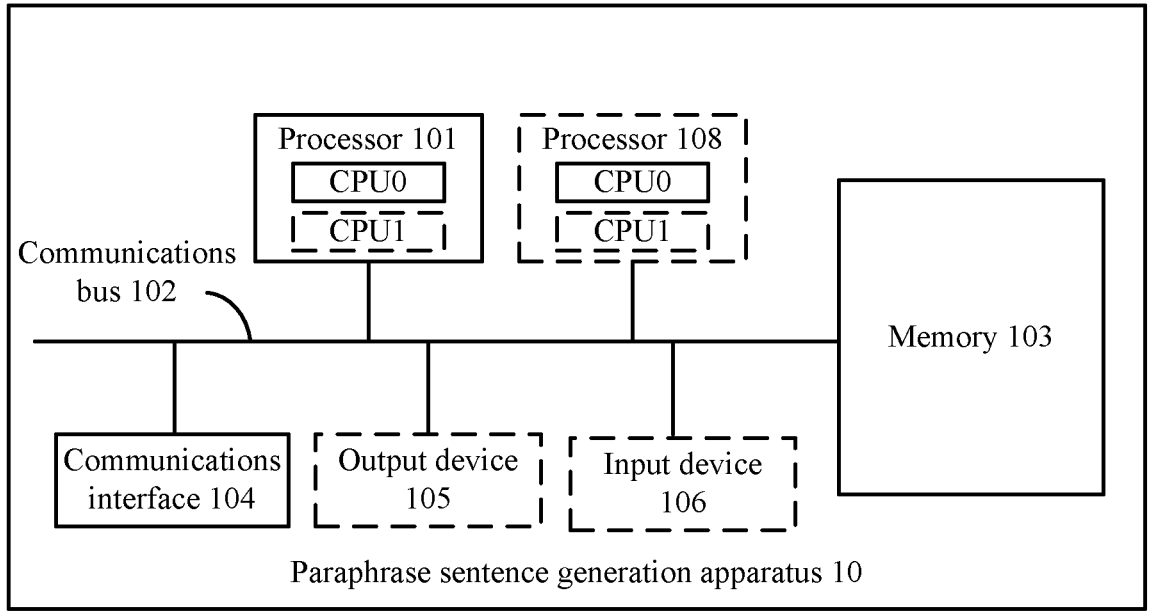
FIG. 1 is a schematic structural diagram of hardware of a paraphrase sentence generation apparatus according to an embodiment of this application.

The following describes the technical solutions in the embodiments of this application with reference to the accompanying drawings in the embodiments of this application. In the descriptions of this application, "/" means "or" unless otherwise specified. For example, AB may represent A or B. In this specification, "and/or" describes only an association relationship for describing associated objects and represents that three relationships may exist. For example, A and/or B may represent the following three cases: only A exists, both A and B exist, and only B exists. In addition, in the descriptions of this application, "a plurality of" means two or more than two.

For ease of understanding of this application, the following briefly describes content related to this application.

Paraphrase: A paraphrase is a different way of expressing a same meaning. For example, sentences such as "What is the distance from the earth to the sun", "How far is the sun from the earth", "What is the distance from the earth to the sun in kilometers", "How many kilometers are there from the earth to the sun", "How far is the earth from the sun", and "What is the distance between the earth and the sun" express a same meaning of asking about the distance between the earth and the sun, and they are "paraphrases" of each other.

The paraphrase is a common phenomenon in natural languages, reflecting complexity and diversity of the natural languages.

The paraphrase is divided into different levels:

Lexical level, also known as synonyms, for example, "tomato" and "tamarillo";

Phrase level, for example, "Peking University" and "PKU", and "consider " and "take . . . into consideration"; and Sentence level, for example, "How tall is Yaoming?" and "What is the height of Yaoming?", and "Messi plays for FC Barcelona in the Spanish Primera League. " and "Messi is a player of Barca in La Liga. "

Paraphrase identification is to determine whether two sentences are in a paraphrase relationship or not, that is, whether meanings of the two sentences match. For example, "What is the distance from the sun to the earth" and "How far is the sun from the earth" are in a paraphrase relationship, while "What is the distance from the sun to the earth" and "What is the distance from the moon to the earth" are not in a paraphrase relationship.

Paraphrase generation is to generate a paraphrase sentence (or several paraphrase sentences) of a given sentence. For example, for a given sentence "How tall is Yaoming?", "What is the height of Yaoming?", "How tall is Yaoming in height?", and the like are generated.

Due to universality of paraphrases in the natural languages, paraphrase identification and generation are involved in many fields of natural language processing, making paraphrase research have great application significance. For example, paraphrase identification and generation may be applied to fields such as machine translation, a question answering system, information extraction, information retrieval, and automatic summarization.

In machine translation, a paraphrase generation technique can be used to rewrite a to-be-translated sentence in the same meaning to generate a more easily translated sentence. For example, flexible but irregular spoken languages are paraphrased as a regular sentence, to achieve a better result in translation. In addition, the paraphrase generation technique can further alleviate a problem of sparse data in a machine translation system, to be specific, a translation training corpus may be added through paraphrase generation.

In the question answering system, the paraphrase generation technique can be used to extend a question in the same meaning, that is, generate a plurality of questions with the same meaning as the original question, to resolve a problem of a same question being expressed in different ways and increase a recall rate of the question answering system. There are two specific implementation ways. One is to rewrite, online, a question submitted by a user to the question answering system and then submit both the question submitted by the user and the rewritten question to the question answering system to recall a result. The other way is to perform paraphrase-based extension on some text content in a knowledge base and add content obtained after the extension to the knowledge base.

In information extraction, the paraphrase generation technique can help automatically generate a large quantity of extraction templates, thereby improving performance of an extraction system.

In information retrieval, as in the question answering system, the paraphrase generation technique can be used to rewrite and extend a searched word, thereby improving search quality.

In automatic summarization, the paraphrase generation technique can be used to help calculate similarity of sentences, to better implement sentence clustering, selection, and the like. In addition, similar to the application in machine translation, the paraphrase generation technique can help improve evaluation of automatic summarization.

The embodiments of this application mainly provide a paraphrase sentence generation method. For a specific process, refer to descriptions in the following corresponding parts. As shown in FIG. 1, an embodiment of this application further provides a schematic structural diagram of hardware of a paraphrase sentence generation apparatus 10. The paraphrase sentence generation apparatus 10 includes at least one processor 101, a communications bus 102, a memory 103, and at least one communications interface 104.

The processor 101 may be a general purpose central processing unit (CPU), a microprocessor, an application-specific integrated circuit (ASIC), or one or more integrated circuits configured to control execution of a program of the solution in this application.

The communications bus 102 may include a path for transmitting information between the foregoing components.

The communications interface 104 may be any apparatus of a transceiver type, and is configured to communicate with another device or a communications network, such as an Ethernet, a radio access network (RAN), or a wireless local area network (WLAN).

The memory 103 may be a read-only memory (ROM) or another type of static storage device that can store static information and instructions, or a random-access memory (RAM) or another type of dynamic storage device that can store information and instructions, or may be an electrically erasable programmable ROM (EEPROM), a compact disc ROM (CD-ROM) or other compact disc storage, optical disc storage (including a compact disc, a laser disc, an optical disc, a digital versatile disc (DVD), a BLU-RAY DISC, and the like), a magnetic disk storage medium or another magnetic storage device, or any other medium that can be configured to carry or store expected program code in a form of an instruction or a data structure that can be accessed by a computer. However, this does not constitute a limitation. The memory 103 may exist independently and is connected to the processor 101 using the communications bus 102. Alternatively, the memory 103 may be integrated with the processor 101.

The memory 103 is configured to store application program code that executes the solution in this application, and the processor 101 controls the execution. The processor 101 is configured to execute the application program code stored in the memory 103 to implement the method provided in the following embodiment of this application.

In specific implementation, in an embodiment, the processor 101 may include one or more CPUs, such as a CPU 0 and a CPU 1 shown in FIG. 1.

In specific implementation, in an embodiment, the paraphrase sentence generation apparatus 10 may include a plurality of processors, such as the processor 101 and a processor 108 shown in FIG. 1. Each of these processors 101 and 108 may be a single-core (single-CPU) processor or a multi-core (multi-CPU) processor. The processors 101 and 108 herein may be one or more devices, circuits, and/or processing cores used to process data (such as a computer program instruction).

In specific implementation, in an embodiment, the paraphrase sentence generation apparatus 10 may further include an output device 105 and an input device 106.

Figure 2:
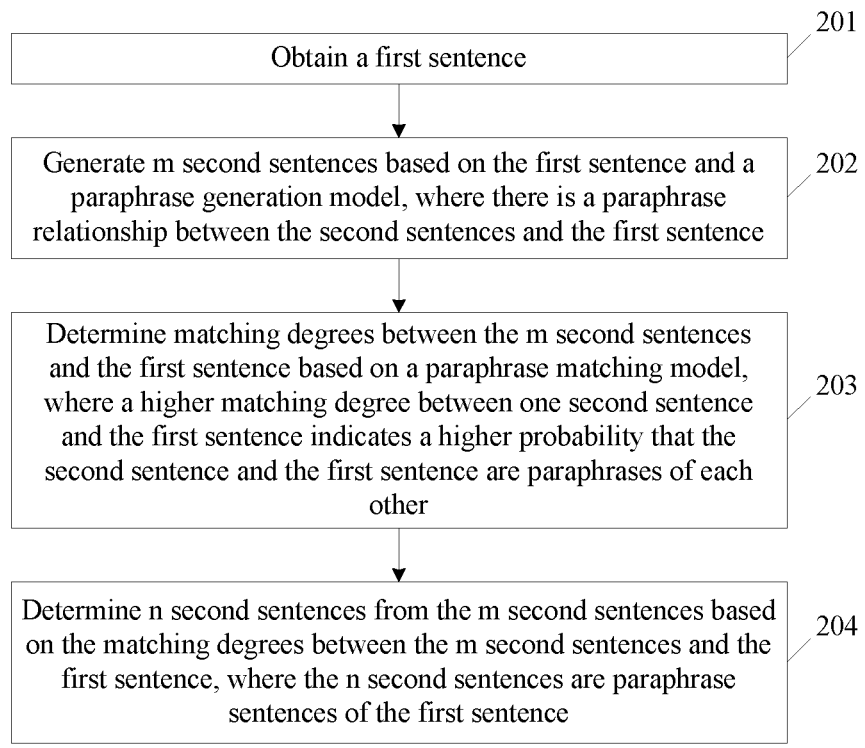
FIG. 2 is a flowchart of a paraphrase sentence generation method according to an embodiment of this application.

An embodiment of this application provides a paraphrase sentence generation method. As shown in FIG. 2, this method includes the following steps.

Step 201. Obtain a first sentence.

The method provided in this embodiment of this application may be executed by a paraphrase sentence generation apparatus. The apparatus may be an electronic device with a computing and processing capability. For example, the apparatus may be a computer or a mobile device (such as a mobile phone or a tablet computer).

The first sentence obtained by the paraphrase sentence generation apparatus may be entered by a user, read from a memory by the paraphrase sentence generation apparatus, or sent by another device to the paraphrase sentence generation apparatus. Certainly, the first sentence may be alternatively obtained in another manner.

Step 202. Generate m second sentences based on the first sentence and a paraphrase generation model, where there is a paraphrase relationship between the second sentences and the first sentence.

Further, the first sentence may be used as an input of the paraphrase generation model, and the paraphrase generation model outputs the m second sentences. The paraphrase generation model is a model obtained through training, and is used to generate several sentences having a paraphrase relationship with a given sentence. It should be noted that the paraphrase relationship between the first sentence and the second sentence may be strong or weak, and a stronger paraphrase relationship between the first sentence and the second sentence indicates a higher probability that the first sentence and the second sentence are paraphrases of each other.

Step 203. Determine matching degrees between the m second sentences and the first sentence based on a paraphrase matching model, where a higher matching degree between one second sentence and the first sentence indicates a higher probability that the second sentence and the first sentence are paraphrases of each other.

The paraphrase generation model and the paraphrase matching model are both constructed by a deep neural network. The paraphrase generation model is obtained through reinforcement learning-based training based on a reward fed back by the paraphrase matching model.

Step 204. Determine n second sentences from the m second sentences based on the matching degrees between the m second sentences and the first sentence, where the n second sentences are paraphrase sentences of the first sentence.

Herein, m is an integer greater than 0, and n is an integer greater than 0 but less than or equal to m.

The paraphrase matching model is a model obtained through training, and is used to evaluate a matching degree between two sentences. A higher matching degree indicates a higher probability that the two sentences are paraphrases of each other. It should be noted that a device for training the paraphrase generation model and/or the paraphrase matching model may be the paraphrase sentence generation apparatus, or may be another device different from the paraphrase sentence generation apparatus. For example, the paraphrase generation model and/or the paraphrase matching model may be trained on a server cluster, and then transferred to a mobile device (such as a smartphone) for use. The paraphrase generation model and/or the paraphrase matching model may be trained on another device, and then installed or run on the paraphrase sentence generation apparatus in a form of hardware (such as a chip) and/or software (such as an application program).

Figure 3:
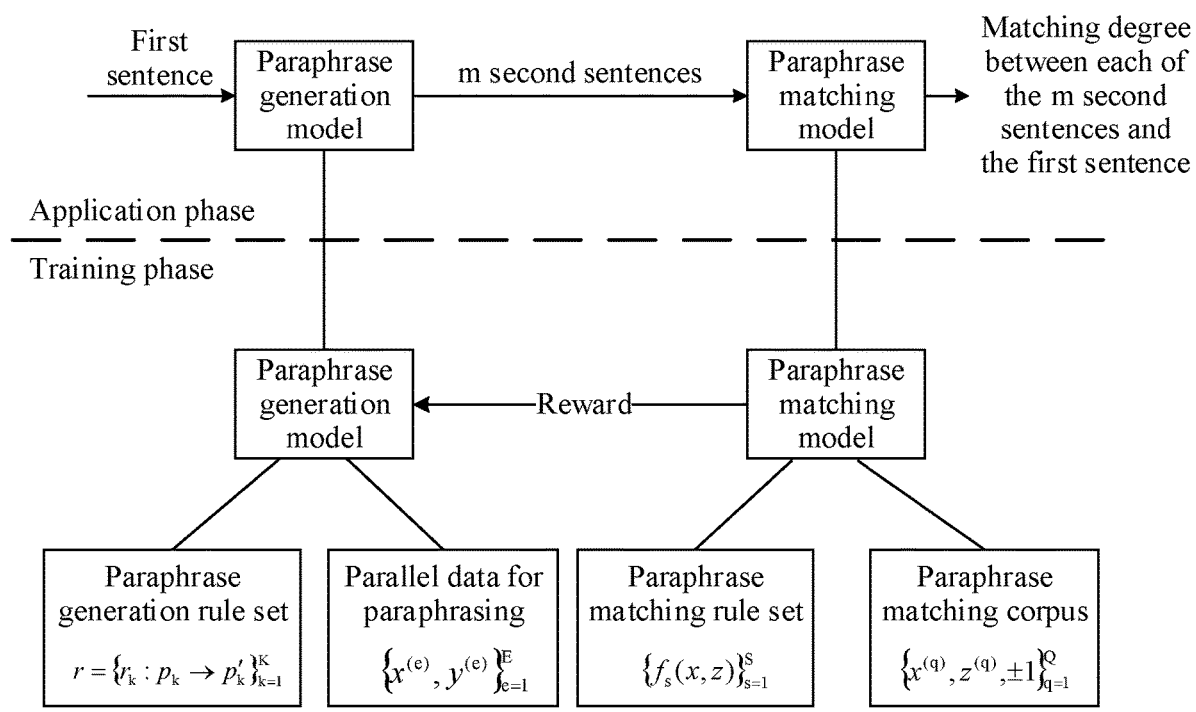
FIG. 3 is a schematic diagram of training and application processes of a paraphrase generation model and a paraphrase matching model according to an embodiment of this application.

As shown in FIG. 3, the paraphrase generation model and the paraphrase matching model may be obtained through training (that is, a training phase shown in FIG. 3), and after the training is complete, may be used to generate n second sentences (that is, an application phase shown in FIG. 3). The paraphrase generation model may be obtained through reinforcement learning-based training based on the reward fed back by the paraphrase matching model. For meanings of parameters shown in FIG. 3, refer to the following descriptions.

In specific implementation, each of the m second sentences may be matched with the first sentence using the paraphrase matching model, and the paraphrase matching model may output a matching degree between each of the m second sentences and the first sentence. When a value of n is determined, the paraphrase sentence generation apparatus may determine the n second sentences with a highest matching degree with the first sentence in the m second sentences as paraphrase sentences of the first sentence. Alternatively, a preset threshold may be set. In this case, the paraphrase sentence generation apparatus may determine a second sentence, in the m second sentences, having a matching degree with the first sentence higher than or equal to the preset threshold as a paraphrase sentence of the first sentence. In this case, the value of n is a quantity of second sentences, in the m second sentences, having matching degrees with the first sentence higher than or equal to the preset threshold.

The preset threshold may be determined based on an actual application scenario. For example, the preset threshold may be 0.4 or 0.6.

Figure 4:
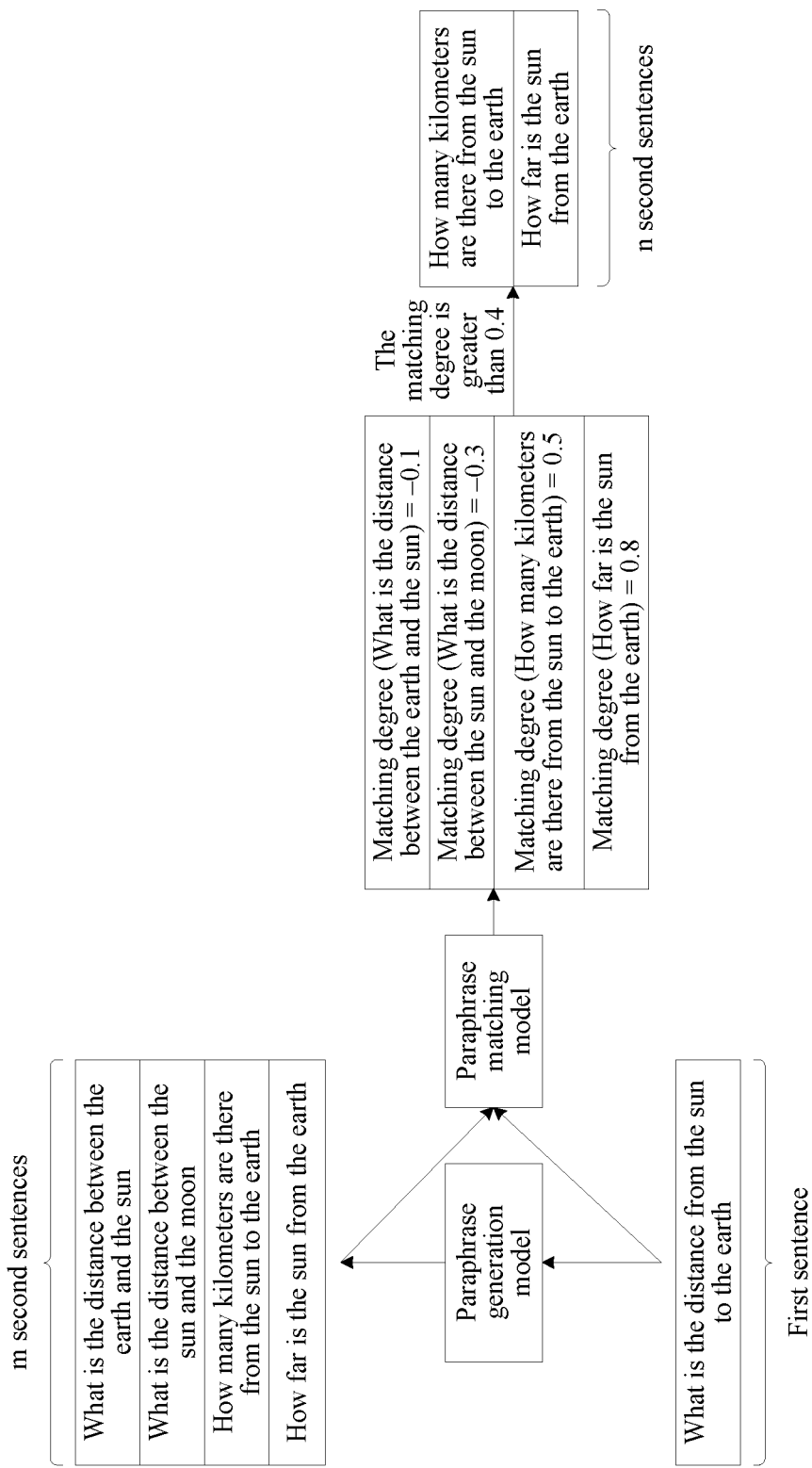
FIG. 4 is a schematic diagram of a process of generating a paraphrase sentence by a paraphrase generation model and a paraphrase matching model according to an embodiment of this application.

For example, as shown in FIG. 4, if the first sentence is "What is the distance from the sun to the earth", the paraphrase generation model may generate four second sentences (that is, the m second sentences) based on the first sentence: "What is the distance between the earth and the sun", "What is the distance between the sun and the moon", "How many kilometers are there from the sun to the earth", and "How far is the sun from the earth". The paraphrase matching model may calculate a matching degree between each second sentence and the first sentence. It is assumed that the matching degrees between the four second sentences and the first sentence are respectively −0.1, −0.3, 0.5 and 0.8. If the preset threshold is 0.4, the paraphrase sentence generation apparatus eventually selects the following two second sentences (that is, the n second sentences) as the paraphrase sentences of the first sentence: "How many kilometers are there between the sun and the earth", and "How far is the sun from the earth".

According to the method provided in this embodiment of this application, the paraphrase generation model is obtained through reinforcement learning-based training based on the reward fed back by the paraphrase matching model. A feature of reinforcement learning lies in enabling the model to improve. In this application, the paraphrase generation model may be continuously improved in a process of reinforcement learning performed on the paraphrase generation model, intensifying a trend for the paraphrase generation model to generate a more accurate paraphrase sentence. This enables the paraphrase generation model to more accurately generate the paraphrase sentence of the first sentence, that is, leads to a higher probability that the generated m second sentences are the paraphrase sentences of the first sentence. In addition, the paraphrase sentence generation apparatus may first generate the m second sentences based on the paraphrase generation model, and then determine the n second sentences from the m second sentences based on the paraphrase matching model. A paraphrase matching process leads to a higher probability that the n second sentences are the paraphrase sentences of the first sentence, thereby improving accuracy of the generated paraphrase sentences.

Optionally, the reward is a matching degree, determined by the paraphrase matching model, between a first input sentence and a first output sentence, where the first input sentence is an input sentence of the paraphrase generation model, the first output sentence is a sentence generated by the paraphrase generation model based on the first input sentence, and there is a paraphrase relationship between the first input sentence and the first output sentence.

The foregoing feedback mechanism needs to be trained through reinforcement learning. Herein, the paraphrase generation model is equivalent to an agent, and the paraphrase matching model constitutes an environment. The generating a paraphrase sentence by the paraphrase generation model may be considered as a series of actions, and a matching result of the paraphrase matching model serves as a reward for these actions, and are fed back to the paraphrase generation model. In this mechanism, learning is performed on the paraphrase generation model using a reinforcement learning method such that the paraphrase generation model can obtain a higher return, that is, the paraphrase matching model can determine that the generated paraphrase sentence has a higher matching degree with the input sentence.

It should be noted that, there are usually a plurality of rewards fed back by the paraphrase matching model to the paraphrase generation model, and the paraphrase generation model may perform reinforcement learning on the paraphrase generation model based on each reward in turn. A process of the reinforcement learning performed on the paraphrase generation model may be completed in the training phase or in the application phase. Alternatively, reinforcement learning may be further performed on the paraphrase generation model in the application phase after the reinforcement training in the training stage is completed. For example, in the application phase, the paraphrase matching model may feedback the reward determined based on the first sentence and each second sentence to the paraphrase generation model, and the paraphrase generation model performs reinforcement learning on the paraphrase generation model based on the reward fed back by the paraphrase matching model.

The paraphrase generation model adjusts its model parameters based on the reward fed back by the paraphrase matching model. A higher reward indicates a higher probability that the paraphrase generation model generates the first output sentence based on the first input sentence after the reinforcement learning is performed based on the reward. Based on this mechanism, the model parameters in the paraphrase generation model are continuously trained and adjusted such that the paraphrase generation model can generate a paraphrase sentence in a more accurate and controllable way.

Optionally, the paraphrase generation model is a model obtained through reinforcement learning performed on the paraphrase generation model according to a policy gradient algorithm, where inputs of the policy gradient algorithm include the first input sentence, the first output sentence, and the reward.

For example, the policy gradient algorithm may be a reinforce algorithm. In the following, this algorithm is used as an example to describe the process of the reinforcement learning performed on the paraphrase generation model based on the reward fed back by the paraphrase matching model.

Figure 5:
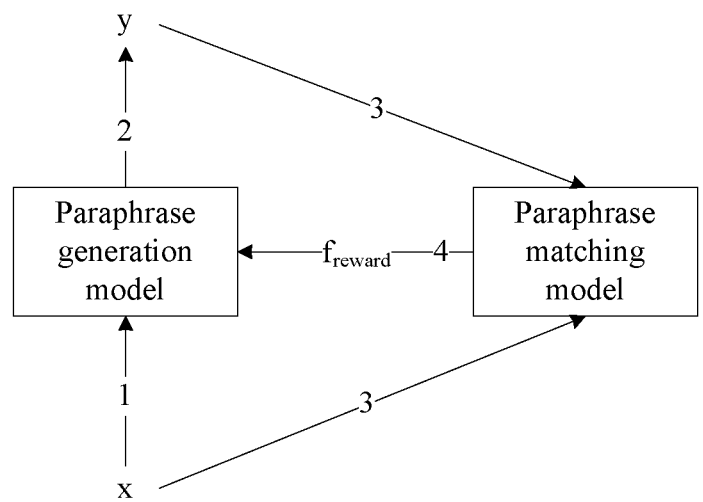
FIG. 5 is a schematic diagram of feeding back a reward by a paraphrase matching model to a paraphrase generation model according to an embodiment of this application.

The paraphrase generation model is denoted as $P(y|x, r;\theta)=\Pi_{j=1}^{J} p(y_j|y_1, \ldots, y_{j-1}, x, r, \theta)$. Meanings of parameters are described in the following. As shown in FIG. 5 (reference numbers in FIG. 5 indicate a sequence of the steps), the paraphrase generation model generates a paraphrase sentence y based on an input sentence x, and the paraphrase matching model gives out a reward $f_{reward}(x, y)$ based on x and y, where f may be a neural network, and may be a deep neural network. According to the reinforce algorithm, a gradient of the paraphrase generation model with the reward is calculated as follows: $\nabla_\theta L(\theta)=\Sigma_{j=1}^{J} \nabla_\theta \log p(y_j|y_1, \ldots, y_{j-1}, x, r, \theta) \cdot f_{reward}(x, y)$. That is, a value of the gradient is directly multiplied by the reward. From this formula, it may be seen that inputs of the policy gradient algorithm include x, y, and $f_{reward}(x, y)$. $\nabla_\theta L(\theta)$ is a gradient vector, including a gradient corresponding to each parameter in the paraphrase generation model. The paraphrase generation model may adjust the model parameters according to $\nabla_{74} L(\theta)$, to obtain a paraphrase generation model on which reinforcement learning is performed. After the reinforcement learning is performed on the paraphrase generation model, a probability that the paraphrase generation model generates y based on x may be increased or reduced. In the reinforcement learning mechanism, the paraphrase generation model can be further optimized such that the generated paraphrase sentence better meets a requirement of the paraphrase matching model, and is closer to an objective in practical application, and more accurate and controllable.

Optionally, the paraphrase generation model includes a primary generation model. The primary generation model is a model obtained through training based on parallel data for paraphrasing. The parallel data for paraphrasing includes at least one paraphrase sentence pair. The paraphrase sentence pair includes two sentences that are paraphrases of each other.

The parallel data for paraphrasing may be represented as $\{x^{(e)}, y^{(e)}\}_{e=1}^{E}$. $\{x^{(e)}, y^{(e)}\}_{e=1}^{E}$ represents that the parallel data for paraphrasing includes a total of E (E is an integer greater than 0) paraphrase sentence pairs, and the $e^{th}$ (e is an integer greater than 0 but less than or equal to E) paraphrase sentence pair may be represented as $\{x^{(e)}, y^{(e)}\}$, where both $x^{(e)}$ and $y^{(e)}$ are text sequences, and $x^{(e)}$ and $y^{(e)}$ are paraphrases of each other. For example, when e=1, $\{x^{(1)}, y^{(1)}\}$ may be {What is the distance from the sun and the earth, How far is the sun from the earth}.

The primary generation model may be obtained through training based on the parallel data for paraphrasing. The primary generation model is a sequence generation model, and may be represented as $P(y|x; \theta)=\Pi_{j=1}^{J} p(y_j|y_{j-1}, x;\theta)$, where θ is a parameter in the primary generation model. After the primary generation model is obtained through training based on the parallel data for paraphrasing, θ is a determined value. In this case, for a given input sequence $x=\{x_1, x_2, \ldots, x_I\}$, at least one output sequence $y=\{y_1, y_2, \ldots, y_J\}$ may be generated according to $P(y|x;\theta)$, where words in the input sequence are words forming the first sentence, words in each output sequence may form one second sentence, I represents a quantity of words in the first sentence, J represents a quantity of words in the second sentence, $y_j$ represents the $j^{th}$ (j is an integer greater than 0 but less than or equal to J) word in the second sentence, and both I and J are integers greater than 0. For example, the primary generation model may be trained using a back propagation (back propagation) algorithm.

For example, if the first sentence is "What is the distance from the sun to the earth", an input sequence of the primary generation model is x={What, is, the, distance, from, the, sun, to, the earth}, a sequence generated according to $P(y|x;(\theta))$ is y={How, far, is, the, sun, from, the, earth}, and the second sentence generated based on the primary generation model is "How far is the sun from the earth".

Optionally, the primary generation model is a sequence-to-sequence model, and may be an encoder-decoder model.

In this embodiment of this application, that the primary generation model is an encoder-decoder model is used as an example to illustrate the method provided in this embodiment of this application. Both the encoder and the decoder may be recurrent neural network (RNN) models, or both the encoder and the decoder may be convolutional neural network (CNN) models, or the encoder may be a CNN model and the decoder may be an RNN model, or the encoder and/or the decoder may be other neural network models/ another neural network model with a user defined architecture. The encoder and the decoder in the primary generation model may be referred to as a generation encoder and a generation decoder.

Optionally, the paraphrase generation model further includes a secondary generation model. The paraphrase generation model is a model obtained by integrating the primary generation model and the secondary generation model. The secondary generation model is a model generated based on a paraphrase generation rule set. The paraphrase generation rule set includes at least one paraphrase generation rule.

The paraphrase generation rule set may be represented as $r\{r_k: p_k \rightarrow p'_k\}_{k=1}^{K}$. $r=\{r_k \rightarrow p'_k\}_{k=1}^{K}$ represents that there are a total of K (K is an integer greater than 0) paraphrase generation rules, where $r_k$ represents the $k^{th}$ (k is an integer greater than 0 but less than or equal to K) paraphrase generation rule, $p_k \rightarrow p'_k$ represents that a paraphrase generation rule is to rewrite $p_k$ to $p'_k$, $p_k$ and $p'_k$ are paraphrases of each other, $p_k$ represents a condition of the paraphrase generation rule, and $p'_k$ represents a result of the paraphrase generation rule. The paraphrase generation rule may be set by users.

For example, it is assumed that a paraphrase generation rule is "What is the distance"→"How far". In this case, p is "What is the distance" and p' is "How far". If the input sentence is "What is the distance between Beijing and Shanghai", because this input sentence meets the condition p of the paraphrase generation rule, a paraphrase sentence "How far is Beijing from Shanghai" of the input sentence may be generated according to the paraphrase generation rule. If the input sentence is "What was the distance from Beijing to Shanghai", because this input sentence does not meet the condition p of the paraphrase generation rule, a paraphrase sentence of the input sentence cannot be generated according to the paraphrase generation rule.

In this application, the secondary generation model generated based on the paraphrase generation rule set may encode the two short texts p and p' of the paraphrase generation rule in the paraphrase generation rule set to obtain a series of vectors, for calculating an attention vector corresponding to the paraphrase generation rule. Therefore, the secondary generation model includes an encoder and a decoder, referred to as a rule encoder and a rule decoder below. For types of the rule encoder and the rule decoder, refer to types of the generation encoder and the generation decoder in the foregoing description.

Based on the foregoing descriptions, the paraphrase generation model may be represented as $P(y|x, r, \theta)=\Sigma_{j=1}^{J}p(y_j|y_1, \ldots, y_{j-1}, x, r, \theta)$. In this case, $\theta$ in the paraphrase generation model includes parameters of the generation encoder and the generation decoder in the primary generation model, and further includes parameters of the rule encoder and the rule decoder in the secondary generation model. This model is still a machine learning model, and end-to-end training may be performed. This model integrates the paraphrase generation rule in a probability model, and effectively utilizes the parallel data for paraphrasing and the paraphrase generation rule such that the paraphrase generation model generates more accurate second sentences.

Figure 6:
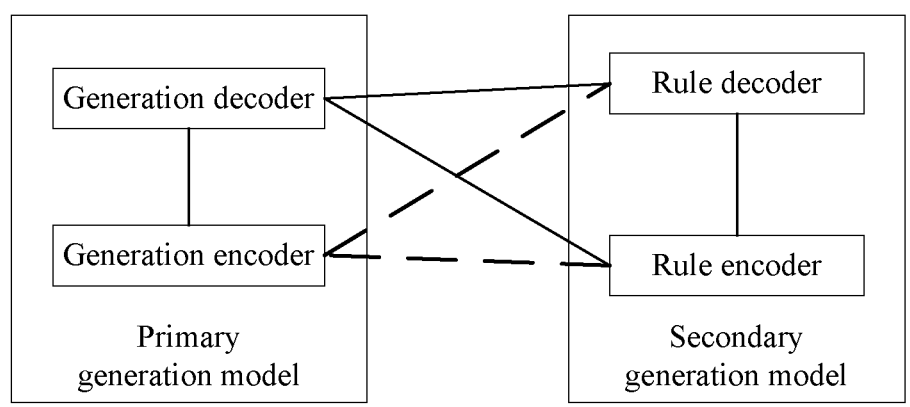
FIG. 6 is a schematic diagram of connections between a paraphrase generation model and a paraphrase matching model according to an embodiment of this application.

For example, as shown in FIG. 6, in a possible implementation, the generation encoder, the rule encoder, and the rule decoder are all connected to the generation decoder. Optionally, the generation encoder may be further connected to the rule encoder and the rule decoder such that a complete differentiable paraphrase generation model is formed and the paraphrase generation model can implement centralized end-to-end training.

In the training of the paraphrase generation model in this embodiment of this application, the paraphrase generation rule may be integrated, and the end-to-end training may be implemented, thereby reducing complexity of a system. The paraphrase generation model can be data-driven, and integrates knowledge of the paraphrase generation rule. This improves training efficiency and a use effect of paraphrase generation.

Optionally, the primary generation model and the secondary generation model are integrated using an attention mechanism. The attention mechanism is used to dynamically adjust words in the first sentence and an attention degree of the paraphrase generation rule in the process of generating the m second sentences by the paraphrase generation model. The attention degree is represented by an attention vector set.

Optionally, the attention vector set includes an attention vector that corresponds to the at least one paraphrase generation rule in a one-to-one manner. An attention vector corresponding to a first paraphrase generation rule is obtained through calculation based on a first paraphrase sentence pair. The first paraphrase sentence pair meets the first paraphrase generation rule. The first paraphrase generation rule is any one of the at least one paraphrase generation rule.

The attention vector set may further include an attention vector corresponding to each word in the second sentences.

The attention mechanism is a mechanism of dynamically controlling an attention degree of each part or a specific part in a neural network model by calculating an attention weight of each part in the neural network model and combining the attention weights into an attention vector. In this embodiment of this application, during generation of the $j^{th}$ word in the second sentence, a generation probability of the $j^{th}$ word may be calculated based on a calculated attention weight of each word in the first sentence, an attention vector that corresponds to the $j^{th}$ word and that is obtained through combination, and an attention vector corresponding to the paraphrase generation rule. The calculating process is performed with reference to both the attention degree of each word in the first sentence and the attention degree corresponding to each paraphrase generation rule.

It should be noted that, the paraphrase generation model may sequentially generate the first word to the $j^{th}$ word in the second sentence, and concatenate the first word to the $j^{th}$ word to obtain the second sentence.

Further, the generation encoder is configured to calculate a hidden state variable of each word in the first sentence, and the generation decoder is configured to calculate the attention vector corresponding to the $j^{th}$ word in the second sentence and the attention vector having a one-to-one correspondence with the paraphrase generation rule in the paraphrase generation rule set, and calculate the generation probability of the $j^{th}$ word in the second sentence based on the attention vector having a one-to-one correspondence with the paraphrase generation rule in the paraphrase generation rule set, the $(j-1)^{th}$ word in the second sentence, a hidden state variable of the $(j-1)^{th}$ word in the second sentence, and the attention vector corresponding to the $j^{th}$ word in the second sentence.

Figure 7:
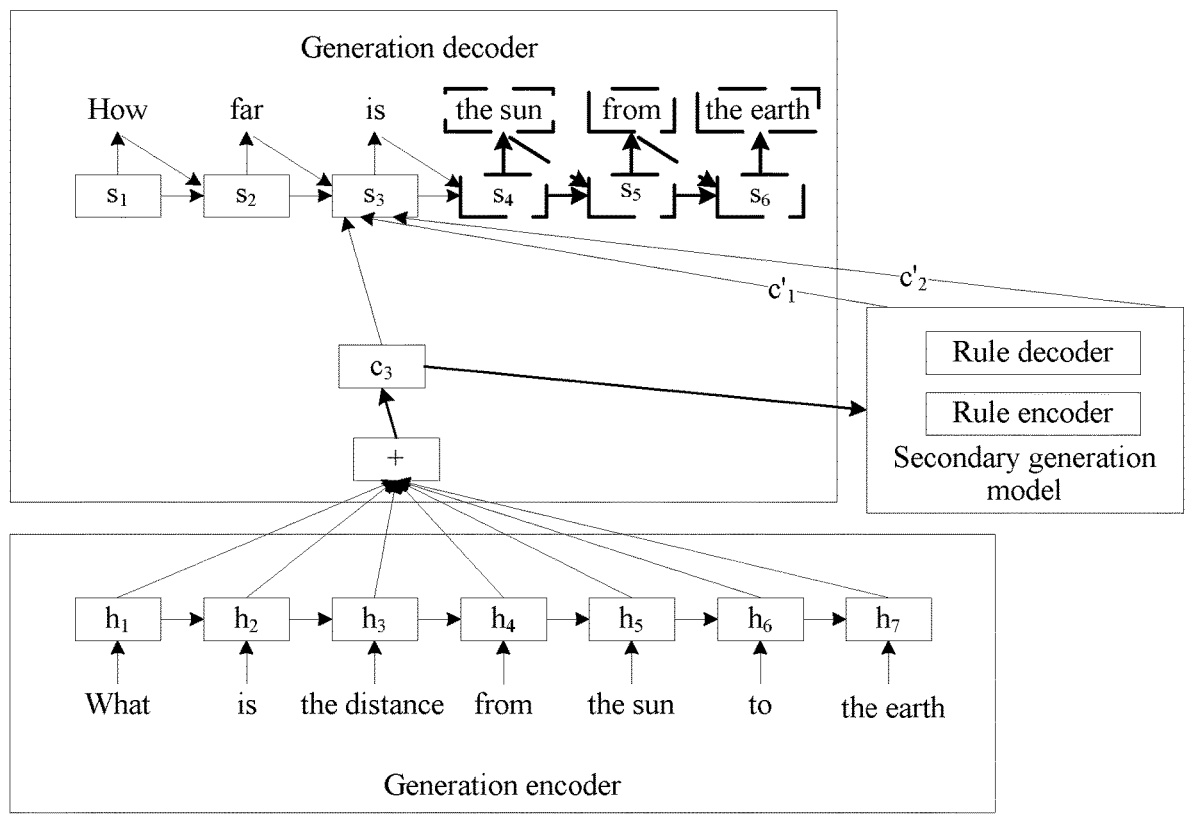
FIG. 7 is a schematic diagram of generating words in a second sentence according to an embodiment of this application.

For example, as shown in FIG. 7, if the first sentence is "What is the distance from the sun to the earth", an input sequence of the generation encoder of the paraphrase generation model is x={What, is, the distance, from, the sun, to, the earth}. The $i^{th}$ word in the input sequence is denoted as x, where i is an integer greater than 0 but less than or equal to I. Each word in the input sequence may correspond to a hidden state variable, and a hidden state variable corresponding to $x_i$ is denoted as $h_i$, where $h_i=f_h(x_i, h_{i-1})$. A simple implementation is $f_h(x_i, h_{i-1})=\phi(Ux_i+Wh_{i-1})$, where $\phi$ is a sigmoid function, and U and W are parameters in the function. For example, $$\phi(Ux_i + Wh_{i-1}) = \frac{1}{1 + \exp(-(Ux_i + Wh_{i-1}))}.$$

In practice, a more complex long short-term memory (LSTM) network or a gated recurrent unit (GRU) is often used to perform modeling for f.

In this application, the attention mechanism is introduced into the paraphrase generation model. Further, when the generation decoder generates the $j^{th}$ word in the second sentence, the attention vector $c_j=\Sigma_{j=1}^{J}\alpha_{ji}h_i$ corresponding to the $j^{th}$ word is calculated, where $$\alpha_{ji} = \frac{\exp(e_{ji})}{\sum_{i=1}^{I}\exp(e_{ji})},$$

and $\alpha$ is an attention weight. The attention weight $\alpha_{ji}$ has a physical meaning, that is, represents an attention paid to the $i^{th}$ word in the input sequence when the generation decoder outputs the $j^{th}$ word. A common method for calculating $e_{ji}$ is: $e_{ji}=v^T \tanh(W_{s_{j-1}}+Uh_i)$, where v, W, and U are parameter matrices. In this case, $$c_j = \sum_{j=1}^{J} \frac{\exp(v^T\tanh(Ws_{j-1} + Uh_i))}{\sum_{i=1}^{I}\exp(v^T\tanh(Ws_{j-1} + Uh_i))}h_i,$$

where $s_{j-1}$ is the hidden state variable of the $(j-1)^{th}$ word in the second sentence, and $v^T$ is a transposed matrix of v. It can be learned that hidden state variables of all the words in the first sentence need to be used for calculating an attention vector corresponding to each word in the second sentence.

Before the attention mechanism is introduced into the paraphrase generation model, the generation decoder may determine the second sentence based on hidden state variables of J words in the second sentence. The hidden state variables of the J words in the second sentence are denoted as $\{s_1, s_2, \ldots, s_J\}$, and a method for calculating the hidden state variable of the $j^{th}$ word in the second sentence may be $s_j = f_s(y_{j-1}, s_{j-1})$. An output probability of the $j^{th}$ word is $p(y_j|y_1, \ldots, y_{j-1}) = g_s(s_j, y_{j-1}) = \phi(Ey_{j-1} + W_0 s_j)$, where g is a neural network, and may be a deep neural network, and E and $W_0$ are parameters. When each hidden state variable of each word in the second sentence is determined, the generation decoder can continuously generate words, and a sequence is ultimately formed (that is, a sequence including the words in the second sentence is formed).

After the attention mechanism is introduced into the paraphrase generation model, the hidden state variable of the $j^{th}$ word in the second sentence may be determined based on the attention vector of the $j^{th}$ word in the second sentence. That is, the foregoing method for calculating the hidden state variable of the $j^{th}$ word in the second sentence may be changed to $s_j = f_s(y_{j-1}, s_{j-1}, c_j)$.

In an implementation, $s_j = f_s(y_{j-1}, s_{j-1}, c_j) = \phi(Uy_{j-1} + Ws_{j-1} + Cc_j)$, where U, W, and C are parameters, and the probability of generating the $j^{th}$ word by the generation decoder is changed to $p(y_j|y_1, \ldots, y_{j-1}) = g_s(s_j, y_{j-1}, c_j) = \phi(Ey_{j-1} + W_0 s_j + C_0 c_j)$, where E, $W_0$, and $C_0$ are parameters.

The secondary generation model is also introduced in this embodiment of this application. The generation decoder may further calculate an attention vector corresponding to each paraphrase generation rule. In this case, the generation decoder may calculate, using the neural network model, the generation probability of the $j^{th}$ word in the second sentence based on the attention vector having a one-to-one correspondence with the paraphrase generation rule in the paraphrase generation rule set, the $(j-1)^{th}$ word in the second sentence, the hidden state variable of the $(j-1)^{th}$ word in the second sentence, and the attention vector of the $j^{th}$ word in the second sentence. For example, the neural network model may be a multiplayer perceptron (MLP).

For example, as shown in FIG. 7, when the generation decoder needs to calculate a probability of outputting "the earth" after "the sun" and "to" are output in the second sentence, if two paraphrase generation rules are integrated in the paraphrase generation model, and attention vectors corresponding to the two paraphrase generation rules are $c'_1$ and $c'_2$, the generation decoder may calculate, based on "to", $s_2$, $c_3$, $c'_i$, and $c'_2$, the probability of outputting "the earth" after "the sun" and "to" are output in the second sentence.

It should be noted that, the generation decoder may first determine the $j^{th}$ word in the second sentence in a vocabulary library, and then calculate the generation probability of the $j^{th}$ word. When the probability is greater than a specific value (for example, 0.5 or 0.6), it may be determined that the word can be used as the $j^{th}$ word in the second sentence, otherwise, it may be determined that the word is not the $j^{th}$ word in the second sentence. In this case, the generation decoder may determine another word in the vocabulary library as the $j^{th}$ word in the second sentence, and then calculate a generation probability of this word, until one or more $j^{th}$ words in the second sentence are determined.

An embodiment of this application proposes an attention mechanism-based solution to integrate the primary generation model and the secondary generation model such that end-to-end training can be performed on the paraphrase generation model.

Figure 8:
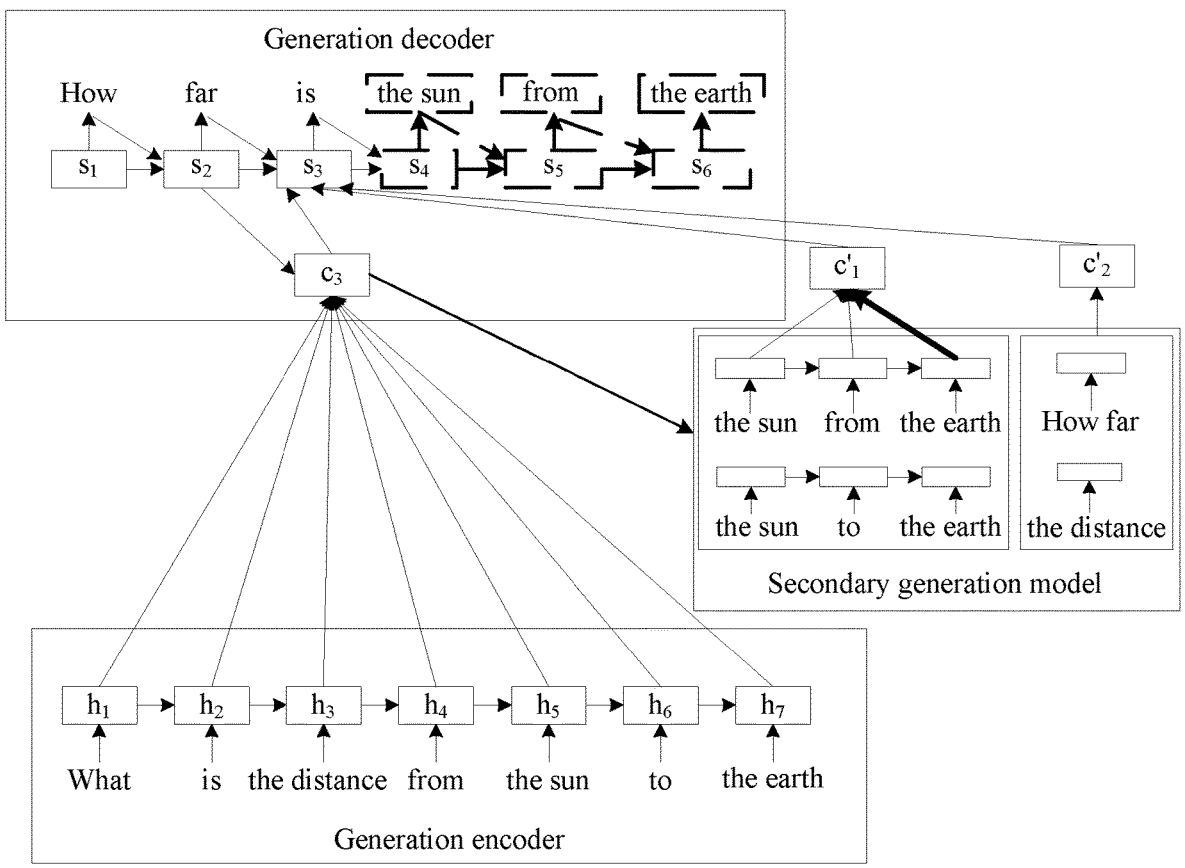
FIG. 8 is another schematic diagram of generating words in a second sentence according to an embodiment of this application.

For example, refer to FIG. 8. The following briefly describes, based on an example shown in FIG. 8, a process of generating the third word in the second sentence by the paraphrase generation model.

(11) Calculate $c_3$. For a calculation method, refer to the foregoing descriptions. In this case, the attention weight focuses mainly on the word "the earth".

(12) Use the rule encoder and the rule decoder in the secondary generation model to encode texts p and p' in the paraphrase generation rule to obtain a series of vectors, where the series of vectors include hidden state variables of words in the texts p and p', and the hidden state variables are used to calculate the attention vector corresponding to the paraphrase generation rule.

Based on the example shown in FIG. 8, two paraphrase generation rules may be included in the example: "the sun to the earth"→"the sun from the earth", and "the distance" "How far". In this case, vectors that correspond to the first paraphrase generation rule and that are obtained by the secondary generation model through encoding include: $h_{the\ sun}$, $N_{to}$, $h_{the\ earth}$, $s_{the\ sun}$, $s_{from}$, $s_{the\ earth}$; and vectors that correspond to the second paraphrase generation rule and that are obtained through encoding include: $h_{the\ distance}$ and $S_{how\ far}$.

(13) Calculate a matching weight between $c_3$ and an encoding result of the rule encoder for each paraphrase generation rule.

For the first paraphrase generation rule, a matching weight between $c_3$ and $h_{the\ sun}/h_{to}/h_{the\ earth}$ is calculated. For the second paraphrase generation rule, a matching weight between $c_3$ and $h_{the\ distance}$ is calculated.

In specific implementation of step (13), the paraphrase generation model may use the neural network model to calculate the matching weight between $c_3$ and the encoding result of the rule encoder for each paraphrase generation rule. For example, the matching weight between $c_3$ and the first paraphrase generation rule is $m_{31} = \phi(Mc_3 + N(h_{the\ sun} + h_{to} + h_{the\ earth})/3)$, and the matching weight between $c_3$ and the second paraphrase generation rule is $m_{32} = \phi(Mc_3 + Nh_{the\ distance})$, where M and N are parameter matrices.

In this case, the matching weight focuses mainly on the first paraphrase generation rule, that is, a value of $m_{31}$ is larger.

(14) Calculate $c'_1$ and $c'_2$ based on $c_3$ and an encoding result of the rule encoder for each paraphrase generation rule.

For the first paraphrase generation rule, $c'_1$ i is calculated based on $c_3$, $s_{the\ sun}$, $s_{from}$, and $s_{the\ earth}$, and for the second paraphrase generation rule, $c'_2$ is calculated based on $c_3$ and $S_{how\ far}$. For example, $c'_1 = \alpha_{the\ sun} s_{the\ sun} + \alpha_{from} s_{from} + \alpha_{the\ earth} s_{the\ earth}$, where $\alpha$ represents the attention weight. For example, the calculation method is $$\alpha_{the\ sun} = \frac{\exp(e_{the\ sun})}{\exp(e_{the\ sun}) + \exp(e_{from}) + \exp(e_{the\ earth})},$$

where $e_{the\ sun} = v^T \tanh(Pc_3 + Qs_{the\ sun})$, and P and Q are parameter matrices. A calculation method of $c'_2$ is similar and is not described herein.

In this case, for the first paraphrase generation rule, the attention weight focuses mainly on "the earth", that is, a value of $\alpha_{the\ earth}$ is larger.

(15) Calculate the generation probability of the "the earth" based on the matching weights $m_{31}$ and $m_{32}$ between $c_3$ and the encoding results of the rule encoder for the paraphrase generation rules, $c_3$, $c'_1$, $c'_2$, $s_2$, and "from".

For example, a hidden state variable $s_3 = \phi(Uy_2 + Ws_2 + Cc_3 + B(m_{31}c'_1 + m_{32}c'_2)/2)$ of "the earth" is calculated, and then the generation probability $p(y_3|y_1, y_2) = \phi(Ey_2 + Fs_3 + Gc_3)$ of "the earth" is calculated, where U, W, C, B, E, F, and G are all parameter matrices.

In this case, the generation probability of "the earth" is the highest, that is, the probability of $p(y_{the\ earth}|y_{the\ sun}, y_{from})$ is the highest.

Optionally, the paraphrase matching model includes a primary matching model. The primary matching model is a model obtained through training based on paraphrase matching data. The paraphrase matching data includes at least one matching sentence pair. The matching sentence pair includes two sentences that are paraphrases of each other or that are not paraphrases of each other.

The paraphrase matching data may be represented as $\{x^{(q)}, z^{(q)}, \pm 1\}_{q=1}^{Q}$. $\{x^{(q)}, z^{(q)}, \pm 1\}_{q=1}^{Q}$ represents that there are a total of Q matching sentence pairs, where $x^{(q)}$, $z^{(q)}$ is a matching sentence pair, both $x^{(q)}$ and $z^{(q)}$ are text sequences, ±1 represents whether $x^{(q)}$ and $z^{(q)}$ are paraphrases, where +1 may represent that $x^{(q)}$ and $z^{(q)}$ are paraphrases and −1 may represent that $x^{(q)}$ and $z^{(q)}$ are not paraphrases, or +1 may represent that $x^{(q)}$ and $z^{(q)}$ are not paraphrases and −1 may represent that $x^{(q)}$ and $z^{(q)}$ are paraphrases.

The primary matching model may be obtained through training based on the paraphrase matching data. The primary matching model may be represented as $f_D(x, z; \eta)$, where $\eta$ is a parameter in the primary matching model. The primary matching model may determine a paraphrase degree, that is, a matching degree, of two input sentences.

Optionally, the primary matching model may be a CNN model or another user-defined neural network model.

In this embodiment of this application, that the primary matching model is a CNN model is used as an example to illustrate a process of determining a matching degree between two sentences by the primary matching model.

Figure 9:
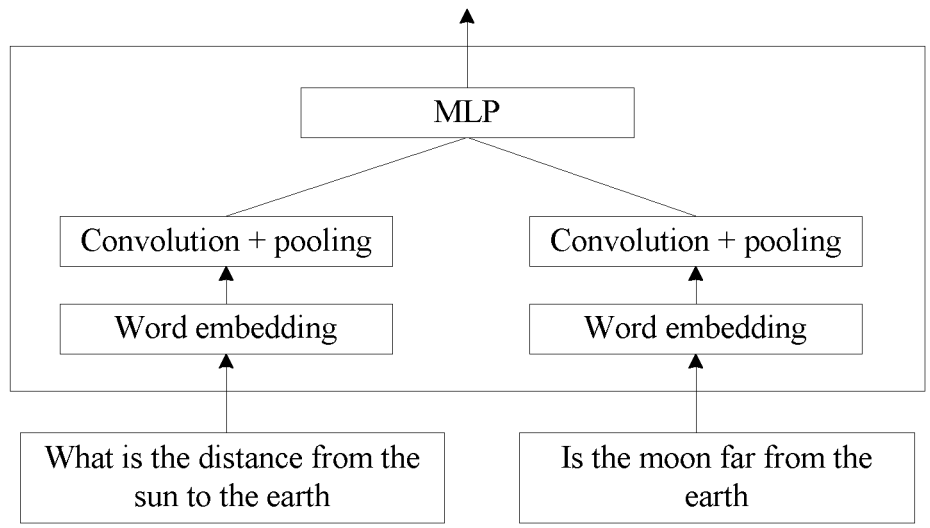
FIG. 9 is a schematic diagram of a paraphrase matching process according to an embodiment of this application.

For example, FIG. 9 shows a model architecture of the CNN model. Further, for each input sentence (for example, as shown in FIG. 9, the input sentences may be "What is the distance from the sun to the earth" and "Is the moon far from the earth"), each word in the input sentences is first mapped to a word vector (word embedding), and then the input sentences are converted to vectors of a fixed length through convolution and pooling calculation. The two input sentences are processed and calculated in a same way and share a same parameter. Then, the vectors of the two input sentences are concatenated, and an estimated matching degree between the two input sentences is obtained through one MLP. The foregoing calculation process is summarized as a function $f_{CNN}(x, z; \eta)$ where $\eta$ is the parameters in the model, including a word vector parameter, a convolution kernel parameter, and an MLP parameter. With the paraphrase matching data $\{x^{(q)}, z^{(q)}, \pm 1\}_{q=1}^{Q}$ as a training set, the paraphrase matching model may be obtained through training based on a back propagation algorithm.

In the foregoing calculation process, a calculation method for performing convolution on an input sentence x of the primary matching model is $g_p^q = \phi(W^q[x_p^T, x_{p+1}^T, \ldots, x_{p+k-1}^T] + b_q)$, where $g_p^q$ is a value of the $q^{th}$ feature of the $p^{th}$ window after convolution is performed on x, k represents a length of a sliding window, $W^q$ and $b_q$ are parameters in the convolution calculation, and $x_p^T$ represents transposition of a vector used to represent the $p^{th}$ word in x. A calculation method of pooling is max-pooling $g^q = \max(g_1^q, g_2^q, \ldots, g_I^q)$, where $g^q$ is a pooled value of the $q^{th}$ feature. The convolution and pooling method may be performed repeatedly for many times. This method may also be used for performing convolution on another input sentence of the primary matching model.

A model for calculating a matching degree between two sentences based on the neural network is referred to as a deep matching model. There are many types of deep matching models. Only one implementation is described above. The method provided in this embodiment of this application may also be applied to another similar model.

Optionally, the paraphrase matching model further includes at least one secondary matching model. The paraphrase matching model is a model obtained by integrating the primary matching model and the at least one secondary matching model. The secondary matching model is a model generated according to a paraphrase matching rule.

Optionally, the paraphrase matching model is a model obtained through a weighted sum of the primary matching model and the at least one secondary matching model.

The paraphrase matching rule set may be represented as $\{f_s(x, z)\}_{s=1}^{S}$. $\{f_s(x, z)\}_{s=1}^{S}$ represents that there are a total of S (S is an integer greater than 0) rules, where $f_s(x, z)$ represents the $s^{th}$ (s is an integer greater than 0 but less than or equal to S) rule. The paraphrase matching rule may be understood as a criterion for determining whether two sentences meet a paraphrase requirement.

For example, a paraphrase matching rule 1 may be when an edit distance of two sentences is greater than a first preset value, determining that the two sentences meet a requirement of differential paraphrases. This paraphrase matching rule can make the two sentences be quite literally different, and prevents them from being excessively similar (for example, "What is the distance from the sun to the earth" and "What's the distance from the sun to the earth"). The edit distance of the two sentences may be represented as $f_1(x, z) = \text{EditDistance}(x, z)$ (that is, a secondary matching model generated according to the paraphrase matching rule 1), and x and z are the two sentences.

A paraphrase matching rule 2 may be when a language model probability score difference between a paraphrase sentence of a sentence and the sentence is greater than a second preset value, determining that the paraphrase sentence of the sentence meets a paraphrase fluency requirement. This matching rule can make the paraphrase sentence of the sentence more concise or easier to understand than the sentence itself (for example, the sentence may be "What is the distance from the sun to the earth", and the paraphrase sentence of the sentence may be "How far is the sun from the earth"). The language model probability score difference between the two sentences may be represented as $f_2(x, z) = \log P_{LM}(z) - \log P_{LM}(x)$ (that is, a secondary matching model generated according to the paraphrase matching rule 2), where $P_{LM}$ represents a language model probability score, x is the sentence, and z is the paraphrase sentence of the sentence.

The first preset value and the second preset value may be determined based on an actual application scenario.

The secondary matching models determined according to the paraphrase matching rules and the primary matching model obtained through training are integrated to form a final paraphrase matching model. For example, the secondary matching models and the primary matching model may be integrated using a linear model: $f(x, z) = w_0 f_{CNN}(x, z; \eta) + w_1 f_1(x, z) + w_2 f_2(x, z)$, where $w_0$ is a weight corresponding to the primary matching model, $w_1$ and $w_2$ are weights corresponding to the two secondary matching models, and $w_0$, $w_1$, and $w_2$ may be set manually, or may be determined according to a rule. In a subsequent process, f (x, z) is used as the paraphrase matching model. In this embodiment of this application, this paraphrase matching model can measure a matching degree between two sentences from a plurality of dimensions such as semantic similarity, literal variance, and fluency.

The solution provided in the embodiment of this application is described above from a method perspective. It should be understood that, to implement the foregoing functions, the paraphrase sentence generation apparatus includes a hardware structure and/or a software module corresponding to the functions. A person skilled in the art should easily be aware that, in combination with the examples described in the embodiments disclosed in this specification, units and algorithm steps may be implemented by hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the paraphrase sentence generation apparatus may be divided into functional modules based on the foregoing method examples. For example, each functional module may be obtained through division corresponding to each function, or two or more functions may be integrated into one processing module. The integrated module may be implemented in a form of hardware, or in a form of a software functional module. It should be noted that, in the embodiments of this application, module division is an example, and is merely a logical function division. In actual implementation, another division manner may be used.

Figure 10:
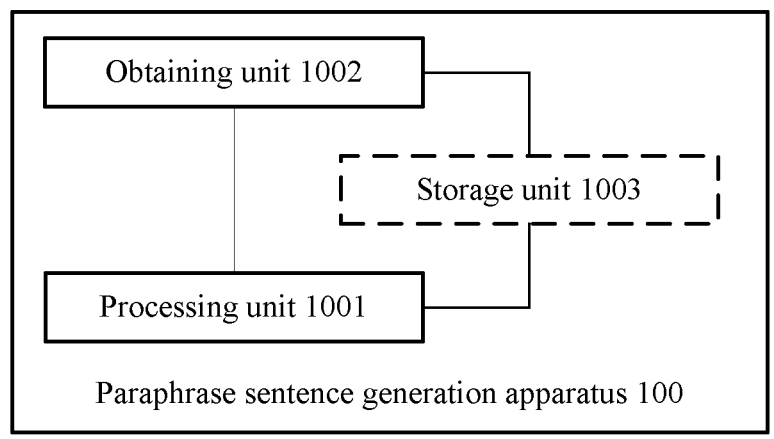
FIG. 10 is a schematic composition diagram of a paraphrase sentence generation apparatus according to an embodiment of this application.

For example, FIG. 10 is a possible schematic structural diagram of a paraphrase sentence generation apparatus 100 in the foregoing embodiments. The apparatus 100 includes a processing unit 1001 and an obtaining unit 1002, and may further include a storage unit 1003. The processing unit 1001 is configured to control and manage an action of the paraphrase sentence generation apparatus 100. For example, the processing unit 1001 is configured to support the paraphrase sentence generation apparatus 100 in performing the method shown in FIG. 2, and/or an action performed by the paraphrase sentence generation apparatus 100 in other processes described in the embodiments of this application. The obtaining unit 1002 is configured to support the paraphrase sentence generation apparatus 100 in obtaining an input sentence (for example, a first sentence or parallel data for paraphrasing). For example, the obtaining unit 1002 may be a communications interface, and in this case, the communications interface may communicate with another device to obtain the input sentence. The storage unit 1003 is configured to store program code and data of the paraphrase sentence generation apparatus 100.

The processing unit 1001 may be a processor or a controller. The obtaining unit 1002 may be a communications interface, a transceiver, a transceiver circuit, a module for reading data in the paraphrase sentence generation apparatus, or the like. The communications interface is a general name, and may include one or more interfaces. The storage unit 1003 may be a memory. When the processing unit 1001 is a processor, the obtaining unit 1002 is a communications interface, and the storage unit 1003 is a memory, the paraphrase sentence generation apparatus in this embodiment of this application may be the paraphrase sentence generation apparatus 10 shown in FIG. 1. The processor 101 is configured to control and manage an action of the paraphrase sentence generation apparatus 10. For example, the processor 101 is configured to support the paraphrase sentence generation apparatus 10 in performing the method shown in FIG. 2, and/or an action performed by the paraphrase sentence generation apparatus 10 in other processes described in the embodiments of this application.

An embodiment of this application further provides a computer readable storage medium including an instruction. When the instruction is run on a computer, the computer is enabled to perform the foregoing method.

An embodiment of this application further provides a computer program product including an instruction. When the computer program product is run on a computer, the computer is enabled to perform the foregoing method.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer program instruction is loaded and executed on a computer, the procedure or functions according to the embodiments of this application are all or partially generated. The computer may be a general-purpose computer, a dedicated computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line (DSL) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a FLOPPY DISK, a hard disk, or a magnetic tape), an optical medium (for example, a DVD), a semiconductor medium (for example, a solid-state drive (SSD), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" do not exclude a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A paraphrase sentence generation method, comprising:
   obtaining a first sentence;
   generating m second sentences based on the first sentence and a paraphrase generation model, wherein each of the m second sentences has a paraphrase relationship with the first sentence, and wherein m is an integer greater than zero;
   determining a matching degree between each of the m second sentences and the first sentence based on a paraphrase matching model, wherein the paraphrase generation model comprises a primary generation model and a secondary generation model, wherein the paraphrase generation model is obtained by integrating the primary generation model and the secondary generation model using an attention mechanism, wherein the primary generation model is obtained through training based on parallel data for paraphrasing, wherein the secondary generation model is based on a paraphrase generation rule set, and wherein a higher matching degree between a second sentence and the first sentence indicates a higher probability that the second sentence and the first sentence are paraphrases of each other;
   determining n second sentences from the m second sentences based on matching degrees between the m second sentences and the first sentence, wherein the n second sentences are paraphrase sentences of the first sentence, wherein n is an integer greater than zero and less than or equal to m, wherein the paraphrase generation model and the paraphrase matching model are both constructed by a deep neural network, wherein the paraphrase generation model is obtained through reinforcement learning-based training, and wherein the reinforcement learning-based training is based on a reward from the paraphrase matching model;
   generating, using the paraphrase generation model and a first input sentence, a first output sentence; and
   determining, using the paraphrase matching model, a second matching degree between the first input sentence and the first output sentence, wherein the first input sentence has a second paraphrase relationship with the first output sentence, and wherein the second matching degree is the reward.

2. The paraphrase sentence generation method of claim 1, wherein the paraphrase generation model is obtained through reinforcement learning and according to a policy gradient algorithm, and wherein inputs of the policy gradient algorithm comprise the first input sentence, the first output sentence, and the reward.

3. The paraphrase sentence generation method of claim 1, wherein the parallel data for paraphrasing comprises a paraphrase sentence pair, and wherein the paraphrase sentence pair comprises two sentences that are paraphrases of each other.

4. The paraphrase sentence generation method of claim 3, wherein the paraphrase generation model is a machine learning model.

5. The paraphrase sentence generation method of claim 4, wherein the attention mechanism dynamically adjusts words in the first sentence and an attention degree of the paraphrase generation rule in a process of generating the m second sentences by the paraphrase generation model, and wherein the attention degree is represented by an attention vector set.

6. The paraphrase sentence generation method of claim 5, wherein the attention vector set comprises an attention vector corresponding to the paraphrase generation rule in a one-to-one manner, wherein the paraphrase sentence generation method further comprises obtaining the attention vector through calculation that is based on the paraphrase sentence pair, and wherein the paraphrase sentence pair meets the paraphrase generation rule.

7. The paraphrase sentence generation method of claim 4, further comprising:
   calculating an attention vector corresponding to a $j^{th}$ word in the second sentence, wherein the attention vector has a one-to-one correspondence with the paraphrase generation rule in the paraphrase generation rule set; and
   calculating a generation probability of the $j^{th}$ word in the second sentence based on the attention vector, a $(j-1)^{th}$ word in the second sentence, and a hidden state variable of the $(j-1)^{th}$ word in the second sentence.

8. The paraphrase sentence generation method of claim 1, wherein the paraphrase matching model comprises a primary matching model, wherein the primary matching model is obtained through training based on paraphrase matching data, wherein the paraphrase matching data comprises a matching sentence pair, and wherein the matching sentence pair comprises two sentences that are not paraphrases of each other.

9. The paraphrase sentence generation method of claim 8, wherein the paraphrase matching model further comprises a secondary matching model based on a paraphrase matching rule, and wherein the paraphrase matching model is obtained by integrating the primary matching model and the secondary matching model.

10. The paraphrase sentence generation method of claim 1, further comprising calculating, during generation of a $j^{th}$ word in the second sentence, a generation probability of the $j^{th}$ word in the second sentence based on a calculated attention weight of each word in the first sentence and an attention vector corresponding to the $j^{th}$ word.

11. The paraphrase sentence generation method of claim 1, further comprising:
   determining the second sentence based on hidden state variables of J words, wherein J represents a quantity of words in the second sentence; and
   determining hidden state variables of a $j^{th}$ word in the second sentence based on an attention vector of the $j^{th}$ word in the second sentence.

12. A paraphrase sentence generation apparatus, comprising:
   a memory configured to store instructions; and
   a processor coupled to the memory and configured to execute the instructions to cause the paraphrase sentence generation apparatus to:
      obtain a first sentence;
      generate m second sentences based on the first sentence and a paraphrase generation model, wherein each of the m second sentences has a paraphrase relationship with the first sentence, and wherein m is an integer greater than zero;

determine a matching degree between each of the m second sentences and the first sentence based on a paraphrase matching model, wherein the paraphrase generation model comprises a primary generation model and a secondary generation model, wherein the paraphrase generation model is obtained by integrating the primary generation model and the secondary generation model using an attention mechanism, wherein the primary generation model is obtained through training based on parallel data for paraphrasing, wherein the secondary generation model is based on a paraphrase generation rule set, and wherein a higher matching degree between a second sentence and the first sentence indicates a higher probability that the second sentence and the first sentence are paraphrases of each other;

determine n second sentences from the m second sentences based on matching degrees between the m second sentences and the first sentence, wherein the n second sentences are paraphrase sentences of the first sentence, wherein n is an integer greater than zero and less than or equal to m, wherein the paraphrase generation model and the paraphrase matching model are both constructed by a deep neural network, wherein the paraphrase generation model is obtained through reinforcement learning-based training, and wherein the reinforcement learning—based training is based on a reward from the paraphrase matching model;

generate, using the paraphrase generation model and a first input sentence, a first output sentence; and determine, using the paraphrase matching model, a second matching degree between the first input sentence and the first output sentence, wherein the first input sentence has a second paraphrase relationship with the first output sentence, and wherein the second matching degree is the reward.

13. The paraphrase sentence generation apparatus of claim 12, wherein the paraphrase generation model is obtained through reinforcement learning performed on the paraphrase generation model and according to a policy gradient algorithm, and wherein inputs of the policy gradient algorithm comprise the first input sentence, the first output sentence, and the reward.

14. The paraphrase sentence generation apparatus of claim 12, wherein the parallel data for paraphrasing comprises a paraphrase sentence pair, and wherein the paraphrase sentence pair comprises two sentences that are paraphrases of each other.

15. The paraphrase sentence generation apparatus of claim 14, wherein the paraphrase generation rule set comprises a paraphrase generation rule.

16. The paraphrase sentence generation apparatus of claim 15, wherein the attention mechanism dynamically adjusts words in the first sentence and an attention degree of the paraphrase generation rule in a process of generating the m second sentences by the paraphrase generation model, and wherein the attention degree is represented by an attention vector set.

17. The paraphrase sentence generation apparatus of claim 16, wherein the attention vector set comprises an attention vector corresponding to the paraphrase generation rule in a one-to-one manner, wherein the processor is further configured to obtain the attention vector through calculation based on the paraphrase sentence pair, and wherein the paraphrase sentence pair meets the paraphrase generation rule.

18. The paraphrase sentence generation apparatus of claim 15, wherein the paraphrase generation rule set is represented as r $\{r_k: p_k \to p'_k\}_{k=1}^{K}$, wherein r=$\{r_k: p_k \to p'_k\}_{k=1}^{K}$ represents a total of K paraphrase generation rules, wherein K is an integer greater than 0, wherein $r_k$ represents a $k^{th}$ paraphrase generation rule, wherein k is an integer greater than 0 but less than or equal to K, wherein $p_k \to p'_k$ represents a paraphrase generation rule to rewrite $p_k$ as $p'_k$, wherein $p_k$ and $p'_k$ are paraphrases of each other, wherein $p_k$ represents a condition of the paraphrase generation rule, and wherein $p'_k$ represents a result of the paraphrase generation rule.

19. The paraphrase sentence generation apparatus of claim 12, wherein the paraphrase matching model comprises a primary matching model, wherein the primary matching model is obtained through training based on paraphrase matching data, wherein the paraphrase matching data comprises a matching sentence pair, and wherein the matching sentence pair comprises two sentences that are not paraphrases of each other.

20. The paraphrase sentence generation apparatus of claim 19, wherein the paraphrase matching model further comprises a secondary matching model, and wherein the paraphrase matching model is obtained by integrating the primary matching model and the secondary matching model.

21. A computer program product comprising computer-executable instructions stored on a non-transitory computer-readable medium that, when executed by a processor, cause a paraphrase sentence generation apparatus to:

obtain a first sentence;

generate m second sentences based on the first sentence and a paraphrase generation model, wherein each of the m second sentences has a paraphrase relationship with the first sentence, and wherein m is an integer greater than zero;

determine a matching degree between each of the m second sentences and the first sentence based on a paraphrase matching model, wherein the paraphrase generation model comprises a primary generation model and a secondary generation model, wherein the paraphrase generation model is obtained by integrating the primary generation model and the secondary generation model using an attention mechanism, wherein the primary generation model is obtained through training based on parallel data for paraphrasing, wherein the secondary generation model is based on a paraphrase generation rule set, and wherein a higher matching degree between a second sentence and the first sentence indicates a higher probability that the second sentence and the first sentence are paraphrases of each other;

determine n second sentences from the m second sentences based on matching degrees between the m second sentences and the first sentence, wherein the n second sentences are paraphrase sentences of the first sentence, wherein n is an integer greater than zero and less than or equal to m, wherein the paraphrase generation model and the paraphrase matching model are both constructed by a deep neural network, wherein the paraphrase generation model is obtained through reinforcement learning-based training, and wherein the reinforcement learning-based training is based on a reward from the paraphrase matching model;

generate, using the paraphrase generation model and a first input sentence, a first output sentence; and determine, using the paraphrase matching model, a second matching degree between the first input sentence and the first output sentence, wherein the first input sentence has a second paraphrase relationship with the first output sentence, and wherein the second matching degree is the reward.

\* \* \* \* \*

UNITED STATES PATENT AND TRADEMARK OFFICE
CERTIFICATE OF CORRECTION

PATENT NO. : 11,586,814 B2
APPLICATION NO. : 16/856450
DATED : February 21, 2023
INVENTOR(S) : Xin Jiang et al.

It is certified that error appears in the above-identified patent and that said Letters Patent is hereby corrected as shown below:

In the Claims

Claim 18, Column 24, Lines 3 and 4: "wherein $r=\{r_k: p_k \rightarrow p'_k\}_{k=1}^{K}$ represents" should read "wherein $r=\{r_k \rightarrow p'_k\}_{k=1}^{K}$ represents"

Signed and Sealed this
Eleventh Day of April, 2023

Katherine Kelly Vidal
*Director of the United States Patent and Trademark Office*